United States Patent
Lennert et al.

(10) Patent No.: US 7,356,729 B2
(45) Date of Patent: Apr. 8, 2008

(54) RESTORATION OF NETWORK ELEMENT THROUGH EMPLOYMENT OF BOOTABLE IMAGE

(75) Inventors: Joseph F. Lennert, Bolingbrook, IL (US); Bill Retzner, Wheaton, IL (US); Monica G. Rodgers, Naperville, IL (US); Bernard G. Ruel, Naperville, IL (US); Srinivasan Sundararajan, Naperville, IL (US); Paul D. Wolfson, Skokie, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 522 days.

(21) Appl. No.: 10/867,592

(22) Filed: Jun. 14, 2004

(65) Prior Publication Data

US 2005/0278583 A1 Dec. 15, 2005

(51) Int. Cl.
*G06F 11/00* (2006.01)

(52) U.S. Cl. .......................................... 714/6
(58) Field of Classification Search .................... 714/6
See application file for complete search history.

(56) References Cited

U.S. PATENT DOCUMENTS

| | | | | |
|---|---|---|---|---|
| 5,553,237 | A * | 9/1996 | Eisenberg et al. | 714/47 |
| 6,625,754 | B1 * | 9/2003 | Aguilar et al. | 714/15 |
| 6,725,396 | B2 * | 4/2004 | Ahrens et al. | 714/10 |
| 7,099,942 | B1 * | 8/2006 | Wilson et al. | 709/224 |
| 2004/0034816 | A1 * | 2/2004 | Richard | 714/39 |
| 2004/0163008 | A1 * | 8/2004 | Kim | 714/4 |

* cited by examiner

*Primary Examiner*—Michael Maskulinski (57) ABSTRACT

A failure of a network element is detected automatically. A bootable image of the network element is electronically retrieved upon detection of the failure of the network element. The bootable image is employed to restore the network element.

12 Claims, 5 Drawing Sheets

RESTORATION OF NETWORK ELEMENT THROUGH EMPLOYMENT OF BOOTABLE IMAGE

TECHNICAL FIELD

The invention relates generally to communication network infrastructure and more particularly to providing a backup for a network infrastructure.

BACKGROUND

A communications network comprises one or more network elements, for example, one or more switches and routers, that carry traffic across the network. The network elements execute software. Backups of the software executed by the network elements are created on one or more physical storage mediums, for example, tapes and optical disks. Currently, the physical storage mediums that contain the backups of the software are manually transported to an off-site location by a craftsperson. As one shortcoming, creating routine backups of the software executed by the network elements on physical storage mediums is costly. As another shortcoming, employing a craftsperson to perform and transport the physical storage medium to an off-site location requires both time and money.

During the backup process, one or more backup images of the software are stored on the physical storage medium. As yet another shortcoming, failing to detect defects in the backup images of the software stored on the physical storage medium reduces the probability of a successful restoration of the software on the network element from the backup images on the physical storage medium.

Upon occurrence of a failure of a network element, the craftsperson retrieves the physical storage mediums containing the backup images of the software for the network element. The craftsperson employs the physical storage medium to reload the software onto the network element. As yet another shortcoming, a craftsperson must be available to retrieve the physical storage mediums and to reload the software. As yet still another shortcoming, damaged physical storage mediums reduce the probability of a successful reload of the software onto the failed network element.

Thus, a need exists for providing a reduction in an amount of manual involvement for creating backups of software of network elements. Another need exists for providing a reduction in an amount of manual involvement in reloading software onto failed network elements. Yet another need exists for providing a reliable means of storage for backups of software for network elements.

SUMMARY

The invention in one implementation encompasses a method. A failure of a network element is detected automatically. A bootable image of the network element is retrieved electronically upon detection of the failure of the network element. The network element is restored through employment of the bootable image.

Another implementation of the invention encompasses an apparatus. The apparatus comprises a backup server component that performs one or more electronic retrievals of one or more bootable images for one or more network elements of a plurality of network elements from one or more remote storage facilities upon one or more failures of the one or more network elements. The backup server component restores the one or more network elements through employment of the one or more bootable images.

A further implementation of the invention encompasses a method. A contiguous vector of contents of an image of a file system of a network element is generated. A bootable image of the file system of the network element is created from the contiguous vector. The bootable image is transmitted electronically to a remote storage facility for storage on the remote storage facility.

DESCRIPTION OF THE DRAWINGS

Features of exemplary implementations of the invention will become apparent from the description, the claims, and the accompanying drawings in which:

DETAILED DESCRIPTION

Figure 1:
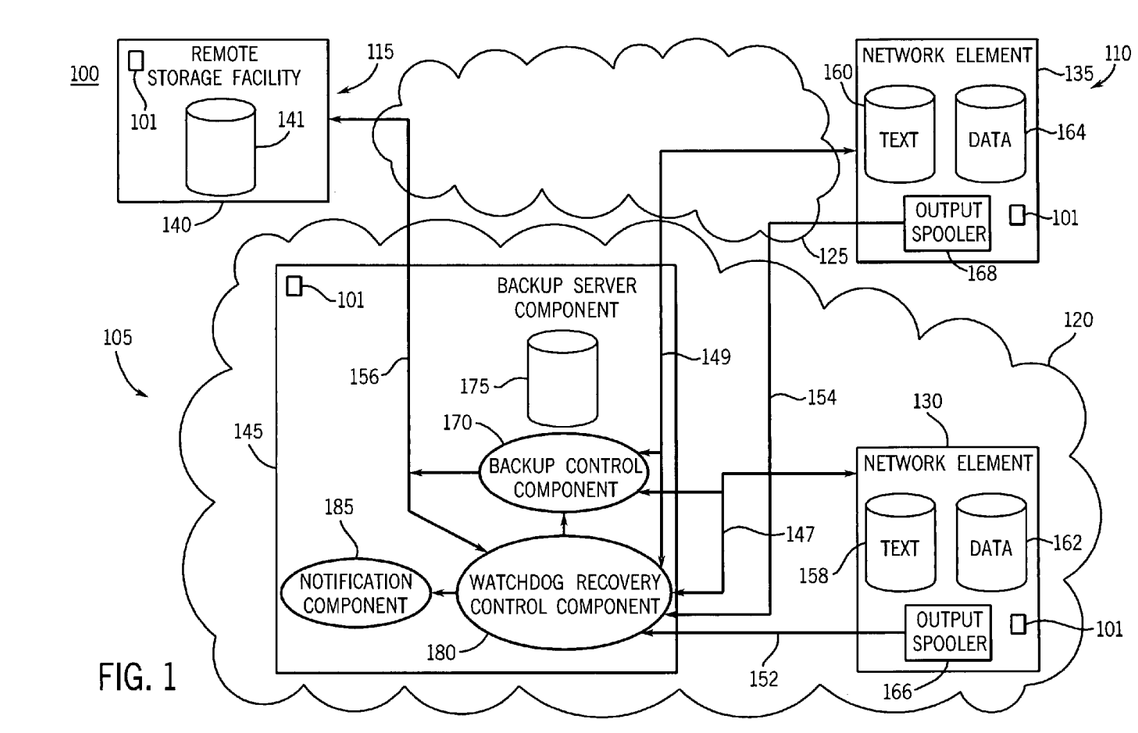
FIG. 1 is a representation of one implementation of an apparatus that comprises one or more geographic locations, one or more networks, one or more network elements, one or more remote storage facilities, and one or more backup server components.

Turning to FIG. 1, an apparatus 100 in one example comprises one or more geographic locations 105, 110, and 115, one or more networks 120 and 125, one or more network elements 130 and 135, one or more remote storage facilities 140, and one or more backup server components 145. In one example, the geographic locations 105 and 110 comprise a first geographic location and the geographic location 115 comprises a second geographic location different from the first geographic location. In another example, the geographic locations 105, 110, and 115 comprise unique geographic locations. The networks 120 and 125 comprise one or more inter-networks and one or more intra-networks. The network elements 130 and 135 comprise one or more telecommunications switches. The remote storage facility 140 in one example comprises one or more storage components 141 located at a geographic location (e.g., geographic location 115) different from a geographic location of the network elements 130 and 135 (e.g., geographic locations 105 and 110). The remote storage facility 140 in one example comprises an instance of the recordable data storage medium 101, as described herein. The network elements 130 and 135 in one example comprise a nodal cluster or a telephone switching system. The network elements 130 and 135 (i.e., the nodal cluster) is connected to the backup server component 140.

The backup server component 145 and the network elements 130 and 135 communicate through employment of one or more direct communication links 147 and 149 and through communication links 152 and 154. The direct communication link 147 and the communication link 152 in one example comprise wired connections. The direct communication link 149 and the communication link 154 in one example comprise Ethernet connections. The direct communication link 149 and the communication link 154 in one example comprise connections via a secured intranet arrangement between the networks 120 and 125. The backup server component 145 employs the direct communication links 147 and 149 to send/receive data to/from the network elements 130 and 135 upon failure of the network elements 130 and 135. The backup server component 145 receives one or more network element event logfiles from the network elements 130 and 135 through employment of the communication links 152 and 154. The backup server component 145 and the remote storage facility 140 communicate over the communication link 156 through employment of one or more electronic file transfer protocols, for example, a File Transfer Protocol ("FTP"). The communication link 156 in one example comprises an Ethernet connection. The communication link 156 in one example comprises a connection via secured intranet arrangement between the networks 120 and 125, as will be understood by the those skilled in the art.

The network elements 130 and 135 comprises one or more instances of a recordable data storage medium 101, as described herein. The network elements 130 and 135 comprise one or more storage components 158, 160, 162, and 164. The storage components 158 and 160 in one example comprise one or more software text components. For example, the storage components 158 and 160 comprise one or more operating systems for the network elements 130 and 135. The storage components 162 and 164 in one example comprise one or more software data components. For example, the storage components 162 and 164 comprise data for one or more applications running on the network elements 130 and 135. The software text components 158 and 160 and the software data components 162 and 164 comprise one or more compiled objects, as will be understood by those skilled in the art. The network elements 130 and 135 comprise output spoolers 166 and 168, respectively. The output spoolers 166 and 168 transmit one or more logfiles, for example, one or more network element event logfiles, to the backup server component 145. For example, the outputs spooler 166 transmits a network element event logfile to the backup server component 140. The logfiles in one example comprises one or more messages regarding the state of the network element, for example, the network element 130.

In one example, the backup server component 145 comprises a network-capable server. In another example, the backup server component 145 comprises an adjunct backup server. The backup server component 145 employs a Transfer Control Protocol/Internet Protocol ("TCP/IP") to communicate with the network elements 130 and 135 and the remote storage facility 140. The backup server component 145 comprises a transport gateway between the network elements 130 and 135, and the remote storage facility 140. The backup server component 145 comprises one or more backup control components 170, one or more storage components 175, one or more watchdog recovery components 180, and one or more notification components 185. The backup server component 145 comprises an instance of the recordable data storage medium 101, as described herein.

The backup control component 170 in one example creates one or more bootable images of one or more file systems of the network elements 130 and 135. A bootable image in one example comprises a software package containing all data needed for a network element to recover from complete, catastrophic software failure. For example, the data needed for the network element to recover comprises information regarding the file system of the network element, for example, software text, data, release and version information.

In one example, the backup control component 170 creates one or more bootable images for one or more software text components. In another example, the backup control component 170 creates one or more bootable images for one or more software data components. The backup control component 170 employs the direct communication links 152 and 154 to obtain information regarding file system structures and file system occupations of the network elements 130 and 135. A file system occupation in one example comprise a size of the file system structure for a file system of the network element 130. The backup control component 170 in one example obtains an image of a file system of the network element 130 through employment of the file system structure and the file system occupation for the file system of the network element 130. The backup control component 170 de-fragments contents of the image of the file system. The backup control component 170 generates a contiguous vector of the contents the image of the file system of the network element. The backup control component 170 generates headers and trailers for the image of the file system. For example, the backup control component 170 generates disk headers, Volume Table of Contents ("VTOC") header and trailers, and End of Image ("EOI") headers and trailers. The backup control component 170 creates a bootable image for a network element, for example, the network element 130, from the contiguous vector of the contents of the image of the file system for the network element 130 and the header and trailers for the image of the file system.

The backup control component 170 performs one or more validations on the contiguous vector images. For example, the backup control component 170 scans a contiguous vector image for viruses. Where the contiguous vector fails the validation, the backup control component 170 discards the contiguous vector. Where the contiguous vector passes the validation, the backup control component 170 generates a bootable image package by compressing the contiguous vector, as will be understood by those skilled in the art.

In one example, the backup control component 170 stores the bootable image package in the storage component 175. In another example, the backup control component 170 stores the bootable image package the storage component 175, and electronically transmits the bootable image package to the remote storage facility 140 for storage. The backup control component 170 employs a file system occupation to allocate and to de-allocate space in the storage component 175 and in the remote storage facility 140 for the bootable image. The backup control component 170 in one example employs FTP to electronically transmit the bootable image package to the remote storage facility 140 over the communication link 156. Through employment of electronic file transfer protocols, the backup control component 170 electronically transmits the bootable image package to multiple off-site locations, as will be appreciated by those skilled in the art.

The backup control component 170 in one example creates one or more versions of a bootable image for a network element. For example, the backup control component 170 creates a first version of a bootable image for the network element 130 at 3:00 am, a second version of a bootable image for the network element 130 at noon, and a third version of a bootable image for the network element 130 at 5:00 pm. The backup control component 170 in one example stores (i.e., caches) the most recent version of the bootable image for the network element 130 (e.g., the third version of the bootable image) in a local database, for example, the storage component 175, as will be appreciated by those skilled in the art. The backup control component 170 transmits the first version of the bootable image for the network element 130 and the second version of the bootable image for the network element 130 to the remote storage facility 140 for storage. The backup control component 170 in one example generates a bootable image size for a version of the bootable image. The backup control component 170 in one example generates a checksum for the version of the bootable image.

The backup control component 170 stores versions of bootable images for the network elements 130 and 135 where a new version of the bootable image differs from a current version of the bootable image. In one example, the backup control component 170 compares a bootable image size of the new version to a bootable image size of the current version. In another example, the backup control component 170 compares a checksum for the new version of the bootable image to a checksum for the current version of the bootable image. The backup control component 170 makes a determination to store the new version of the bootable image based on the bootable image sizes and/or the checksums. The backup control component 170 stores the new version where the bootable image size and the checksum are different than current version, as will be appreciated by those skilled in the art. Where the bootable image size and the checksum for the new version of the bootable image are the same as the bootable image size and the checksum for the current version, the backup control component 170 withholds storing the new version of the bootable image.

In one example, the backup control component 170 makes a determination to create a bootable image for a software text component of the network element 130 (i.e., the storage component 158) based on a comparison between a bootable image size and a checksum for a current version of the bootable image of the software text component and a new version of the bootable image of the software text component. In another example, the backup control component 170 creates a new version of a bootable image for a software data component of the network element 135 (i.e., the storage component 164) regardless of a bootable image size and/or a checksum of a current version of the bootable image for the software data component.

For example, the backup control component 170 stores a first version of a bootable image (i.e., a current version of the bootable image) for the network element 130 on the storage component 175. The backup control component 170 creates a second version of the bootable image (i.e., a new version of the bootable image) for the network element 130. The backup control component 170 stores the second version of the bootable image for the network element 130 where a bootable image size and a checksum of the second version of the bootable image differs from the first version of the bootable image.

Upon occurrence of a fault of the network element 130, the backup control component 170 determines a location of the most recent version of a bootable image for the network element 130. In one example, the location of the most recent version of the bootable image for the network element 130 is the storage component 175. The backup control component 170 retrieves the most recent version of the bootable image for the network element 130. The backup control component 170 copies the most recent version of the bootable image for the network element 130 onto the file system of the network element 130. In another example, the location of the most recent version of the bootable image for the network element 130 is the storage component 141 of the remote storage facility 140. The backup control component 170 electronically retrieves the most recent version of the bootable image for the network element 130 from the remote storage component 140. The backup control component 170 copies the most recent version of the bootable image for the network element 130 onto the file system of the network element 130. The backup control component 170 boots the network element 130.

Where the most recent version of the bootable image for the network element 130 fails to restore the network element 130, the backup control component 170 determines a location of a previous version of the bootable image for the network element 130. The backup control component 170 retrieves the previous version of the bootable image for the network element 130, copies the previous version of the bootable image for the network element 130 onto the file system of the network element 130, and again boots the network element 130. The backup control component 170 traverses one or more previous versions of the bootable image for the network element 130 to restore the network element 130.

In one example, the backup control component 170 schedules one or more backup jobs to create the bootable images for the network elements 130 and 135 based on one or more configured backup frequencies, for example, weekly, daily, or hourly. For example, a site technician for the network element 130 configures the backup control component 170 to schedule a backup job for the network element 130 every three days. The backup control component 170 in one example automatically schedules the backup job to create the bootable image for the file system of the network element 130 every three days. In another example, the backup control component 170 schedules one or more backup jobs based on manual initiation. For example, the site technician employs the backup control component 170 to manually initiate a backup job of the file system of the network element 130.

The backup control component 170 in one example employs a heartbeat system to schedule one or more backup jobs. The heartbeat system in one example monitors the backup frequencies for the network elements to make one or more determinations to schedule backup jobs for the network elements. The heartbeat system in one example is programmed to monitor the backup frequencies at one or more desired intervals, for example, every ten seconds. The heartbeat system schedules a backup job for the network element 135 when the backup frequency for the network element 135 occurs within the desired interval in which the heartbeat system monitors the backup frequencies.

For example, the backup frequency for the network element 130 comprises every day. The backup frequency for the network element 135 comprises every three days. The heartbeat system monitors backup frequencies for the network elements 130 and 135 every day. The heartbeat system schedules backup jobs for the network elements 130 and 135 on a first day. The heartbeat system monitors the backup frequencies for the network elements 130 and 135 on a second day. The heartbeat system determines to schedule the backup job for the network element 130 on the second day. The heartbeat system monitors the backup frequencies for the network elements 130 and 135 on a third day. The heartbeat system determines to schedule the backup job for the network element 130 on the third day. The heartbeat system monitors the backup frequencies for the network elements 130 and 135 on a fourth day. The heartbeat system determines to schedule backup jobs for the network elements 130 and 135 on the fourth day.

The heartbeat system monitors progress of scheduled backup jobs for the network elements 130 and 135. The heartbeat system checks the scheduled backup jobs for stuck backup jobs, for example, a backup job that is actively running but cannot complete, or dead backup jobs, for example, a backup job that failed to complete and is no longer actively running. In one example, the heartbeat system moves the stuck backup jobs and/or the dead backup jobs to an error state. In another example, the heartbeat system removes the stuck backup jobs and/or the dead backup jobs from scheduling and releases any computer-system resources allocated by the stuck backup jobs and/or the dead backup jobs. The heartbeat system removes all files associated with the stuck backup jobs and/or the dead backup jobs. The heartbeat system automatically re-schedules the stuck backup jobs and/or the dead backup jobs. The heartbeat system improves reliability of the bootable images as defective bootable images are removed from the backup server component 145.

The watchdog recovery control component 180 in one example monitors one or more logfiles, for example, one or more network element event logfiles, received from the network elements 130 and 135. The watchdog recovery control component 180 monitors the logfiles to determine failure of a network element. The watchdog recovery control component 180 employs one or more specified triggers, for example, one or more sanity triggers, to determine failure of a network element. The sanity triggers in one example comprise predetermined numbers of faults or initialization events that occur within a predetermined period of time. For example, a sanity trigger comprises a threshold value for a number of restart attempts for the network element 130. The watchdog recovery control component 180 determines an occurrence of a failure of the network element where the network element 130 exceeds the threshold value for the number of restart attempts for the network element 130.

The watchdog recovery control component 180 in one example collects information from the logfiles received from the network elements 130 and 135. The watchdog recovery control component 180 creates backup log data from the information collected from the logfiles. The backup log data in one example comprises historical information regarding the performance of the network elements 130 and 135 and/or the networks 120 and 125. The watchdog recovery control component 180 in one example stores the backup log data in the storage component 175. The watchdog recovery control component 180 employs the backup log data to determine one or more occurrences of failures by the network elements 130 and 135. For example, the watchdog recovery control component 180 employs the backup log data to determine exceedance of a sanity trigger for the network element 135 within a predetermined period of time, for example, a day.

Upon determination of an occurrence of a failure of a network element, for example, the network element 135, the watchdog recovery control component 180 notifies the backup control component 175 to retrieve a bootable image package for the network element 135. The watchdog recovery control component 180 decompresses the bootable image package into a bootable image for the network element 135. The watchdog recovery control component 180 employs the direct connection link 149 to copy the bootable image for the network element 135 onto the file system of the network element 135.

Figure 4:
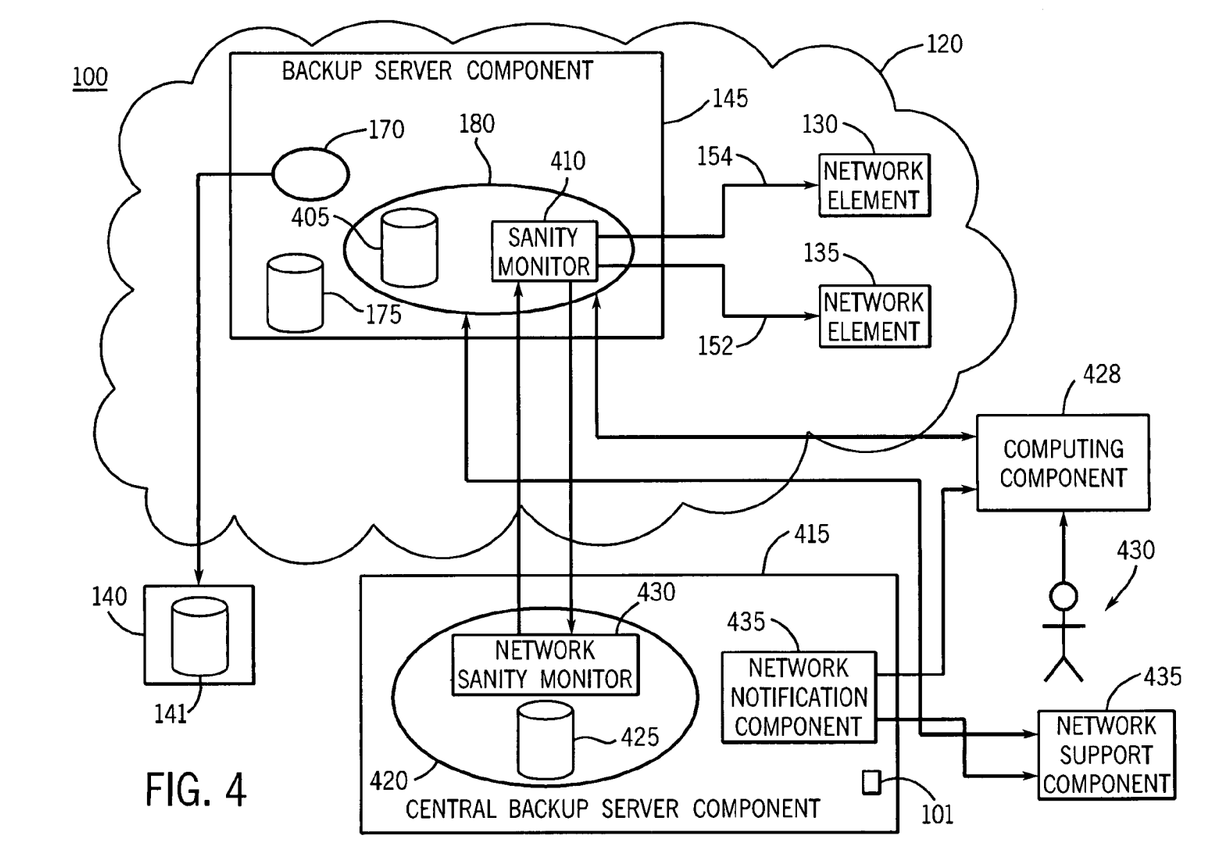
FIG. 4 is a representation of one or more central backup server components, one or more site technicians, one or more network support components, the network elements, the remote storage facility, and the backup server component of the apparatus of FIG. 1.

The watchdog recovery control component 180 communicates with the notification component 185 to initiate one or more notifications to one or more support components, for example, one or more central backup server components 415 (FIG. 4), one or more computing components 428 for site technicians 430 (FIG. 4), and one or more network support components 435 (FIG. 4). In one example, the watchdog recovery control component 180 allows for interaction between the site technician 430 and the backup server component 145. In one example, the watchdog recovery control component 180 allows for establishment of a remote direct connection between the watchdog recovery control component 180 and the computing component 428 for the site technician 430. The site technician 430 in one example interacts with the watchdog recovery control component 180 over the remote direct connection through employment of the computing component 428. For example, the watchdog recovery control component 180 allows the site technician 430 to manually initiate a recovery sequence for the network element 135.

In another example, the watchdog recovery control component 180 allows for establishment of a secured intranet terminal connection between the watchdog recovery control component 180 and the network support component 435. The network support component 435 in one example employs the secured intranet terminal connection to interact with the watchdog recovery control component 180. In yet another example, the watchdog recovery control component 180 interacts with the central backup server component 415 to restore the network element 135, as will be described herein.

The notification component 185 in one example initiates the notifications to the support components. In one example, the notification component 185 initiates one or more text messages to a mobile phone of the site technician. In another example, the notification component 185 sends one or more email messages to the site technician. In yet another example, the notification component 185 communicates the failure of the network element 135 to the central backup server component 415 (FIG. 4).

Turning briefly to FIG. 4, the watchdog recovery control component 180 comprises a trigger table 405 and a sanity monitor 410. The trigger table 405 comprises one or more sanity triggers. The sanity monitor 410 employs the sanity triggers to determine occurrence of a failure of the network element 130. For example, the sanity monitor 410 compares one or more values of a logfile, for example, a network element event logfile, received from the network element 130 with one or more sanity triggers from the trigger table 405 for the network element 130. The sanity monitor 410 determines occurrence of the failure of the network element 130 where the one or more values exceed the one or more sanity triggers for the network element 130. The sanity monitor 410 notifies the central backup server component 415 upon occurrence of the failure.

The central backup server component 415 in one example comprises a network watchdog recovery control component 420 and a network notification component 435. The central backup server component 415 comprises an instances of the recordable data storage medium 101, as described herein. The central backup server component 415 in one example comprises the remote storage facility 140. The network watchdog recovery control component 420 comprises a network trigger table 425 and a network sanity monitor 430. The network trigger table 425 comprises one or more sanity triggers for the backup server component 145. The network sanity monitor 430 receives notification of an occurrence of a failure of the network element 130 from the sanity monitor 410. The network sanity monitor 430 employs the network sanity triggers to determine an appropriate action of the central backup server component 415. For example, the network sanity monitor 430 cooperates with a network notification component 435 to initiate one or more notifications to the site technician 430 and/or the network support component 435.

The network sanity monitor 430 employs the network sanity triggers to develop a health rating for the network 120. For example, the network 120 comprises multiple backup server components 145. The network trigger table 425 comprises one or more network sanity triggers for the multiple backup server component 145. Based upon the number of occurrences of failures of the network elements 130 and/or 135, the network sanity monitor 430 develops a health rating for the network 120. The network sanity monitor 430 employs the network sanity triggers to determine when to initiate a notification to the site technician, for example, to replace the hardware within the network element 130, or when to initiate a notification to the network support component 435.

An illustrative description of exemplary operation of the apparatus 100 is presented, for explanatory purposes.

Figure 2:
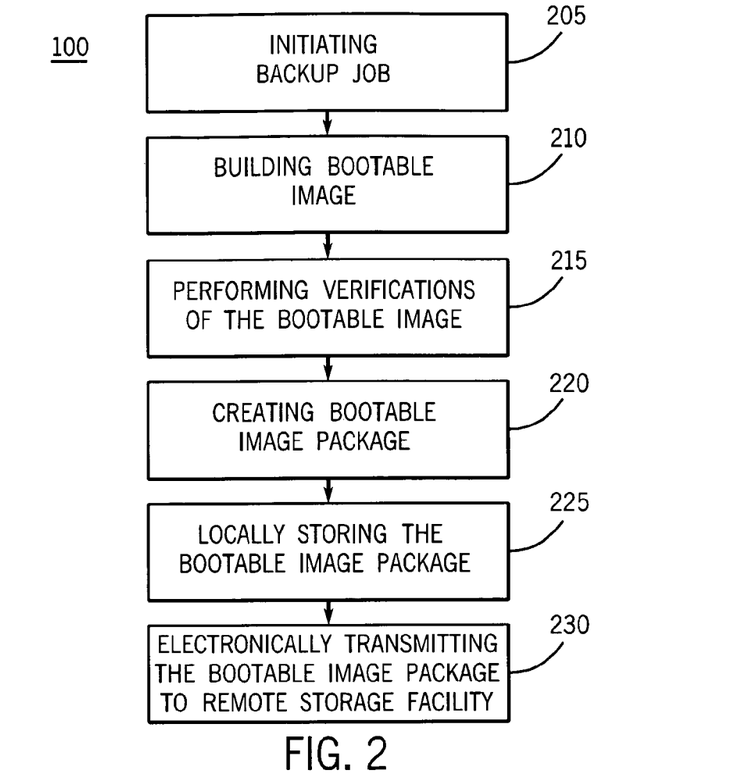
FIG. 2 is a exemplary process flow of electronically transmitting one or more bootable images of the network elements from the backup server component of the apparatus of FIG. 1.

Turning to FIG. 2, in STEP 205, the backup control component 170 initiates a backup job to create a bootable image for the network element 130. In STEP 210, the backup control component 170 builds the bootable image for the network element 130. In STEP 215, the backup control component 170 performs a virus scan on the bootable image. In STEP 220, the backup control component 170 compresses the bootable image. In STEP 225, the backup control component 170 stores the bootable image package. In STEP 230, the backup control component 170 employs the File Transfer Protocol to electronically transmit the bootable image package to the remote storage facility 140.

Figure 3:
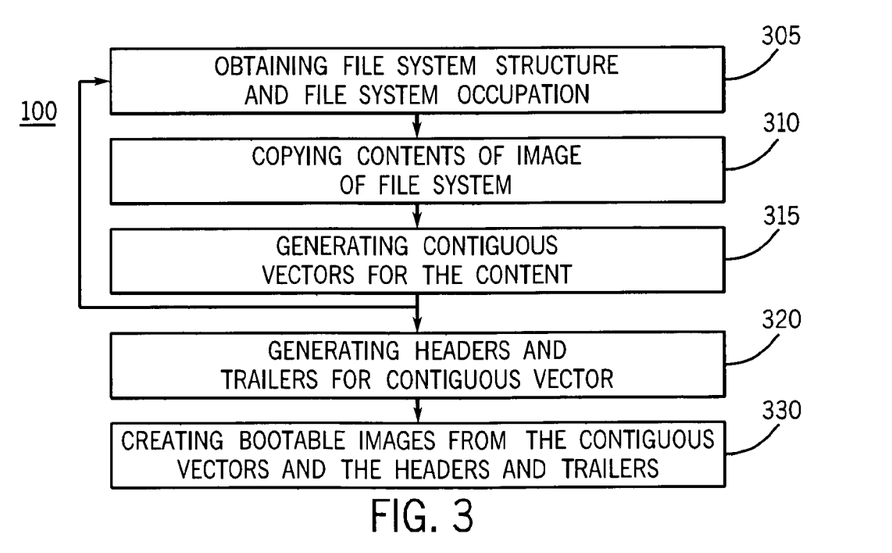
FIG. 3 is an exemplary process flow of creating the bootable images of the network elements of the apparatus of FIG. 1.

Turning to FIG. 3, the backup control component 170 builds bootable images for the network elements 130 and 135. In STEP 305, the backup control component 170 obtains the file system structure and file system occupation from the network element 130. In STEP 310, the backup control component 170 employs the file system occupation to copy contents of the image of the file system. In STEP 315, the backup control component 170 generates a contiguous vector for the contents of the image of the file system of the network element 130. The backup control component 170 performs a validation of the contiguous vector. In STEP 320, where the contiguous vector passes the validation, the backup control component 170 generates headers and trailers for the contiguous vector. In STEP 325, the backup control component 170 creates the bootable image for the network element 130 from the contiguous vector and the headers and trailers for the contiguous vector.

Where the network element 130 comprises multiple physical memory components, for example, multiple hard drives or memory segments, the backup control component 170 repeats STEPS 305 through 315 to generate a contiguous vector for each physical memory component. The backup control component 170 performs a validation of each of the contiguous vectors. In STEP 320, where the contiguous vector passes the validation, the backup control component 170 generates headers and trailers for the contiguous vector. In STEP 325, the backup control component 170 compresses all the contiguous vectors into a bootable image package for the network element 130.

Figure 5:
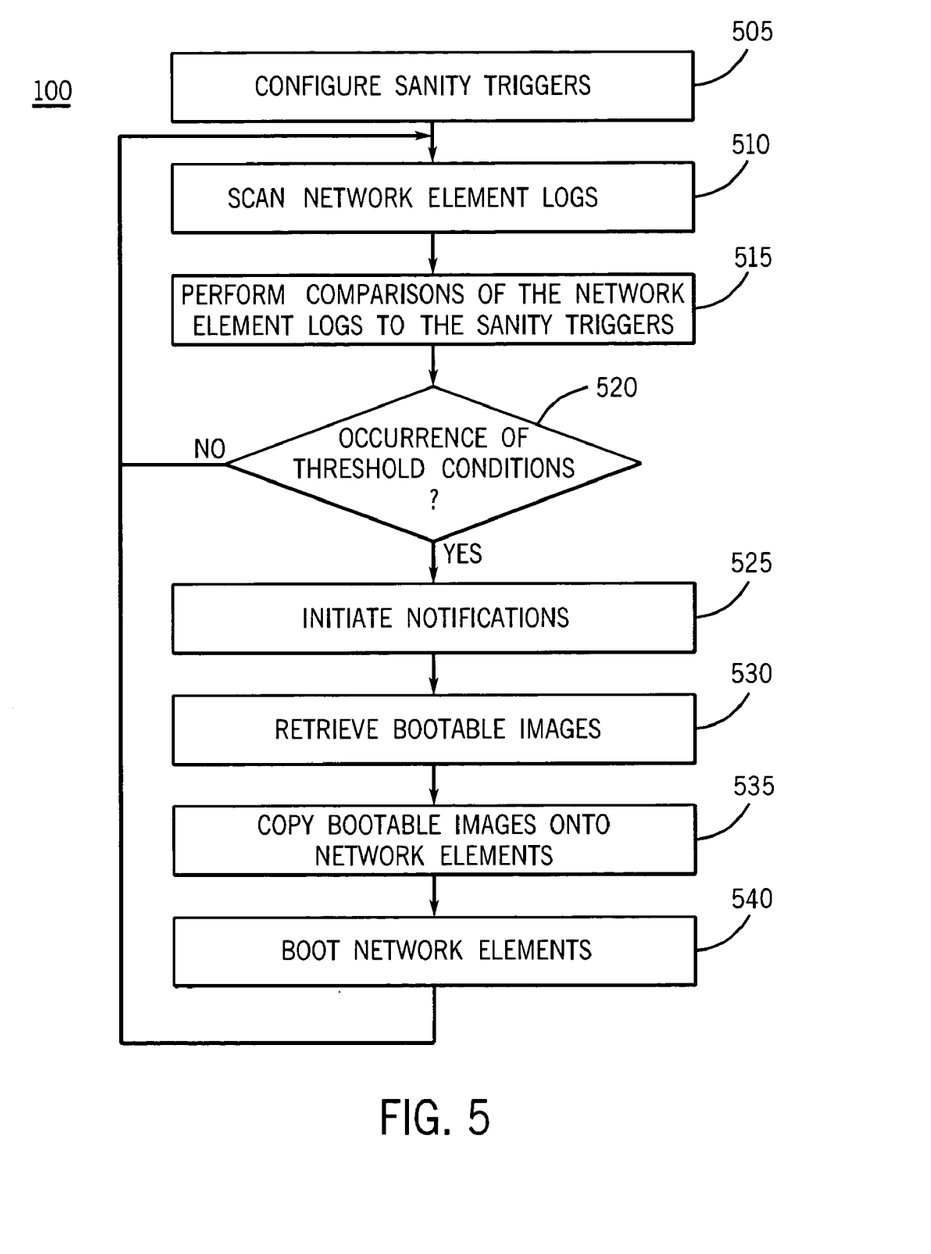
FIG. 5 is an exemplary process flow of restoring the network elements of the apparatus of FIG. 1.

Turning to FIGS. 4-5, in STEP 505, a site technician 430 configures the sanity triggers. In STEP 510, the sanity monitor 410 monitors logfiles, for example, network element event logfiles, to determine occurrence of a failure of the network element 130 and/or the network element 135. The sanity monitor 410 receives a network element event logfile from the network element 135. The sanity monitor 410 retrieves one or more sanity triggers from the trigger table 405 for the network element 135. In STEP 515, the sanity monitor 410 compares values within the network element event logfile to the sanity triggers for the network element 135. In STEP 520, the sanity monitor 410 determines an occurrence of a threshold condition.

In STEP 525, upon the occurrence of the threshold condition, the sanity monitor 410 initiates a notification to the network sanity monitor 430. In STEP 530, the sanity monitor 410 notifies the backup control component 170 to determine a location of a bootable image package for the network element 135. The backup control component 170 retrieves the bootable image package for the network element 135 from the remote storage component 140. The backup control component 170 decompresses the bootable image package. In STEP 535, the backup control component 170 copies the bootable image onto the file system of the network element 135 through employment of the direct communication link 154. In STEP 540, the backup control component 170 employs the direct communication link 154 to boot the network element 135.

Figure 6:
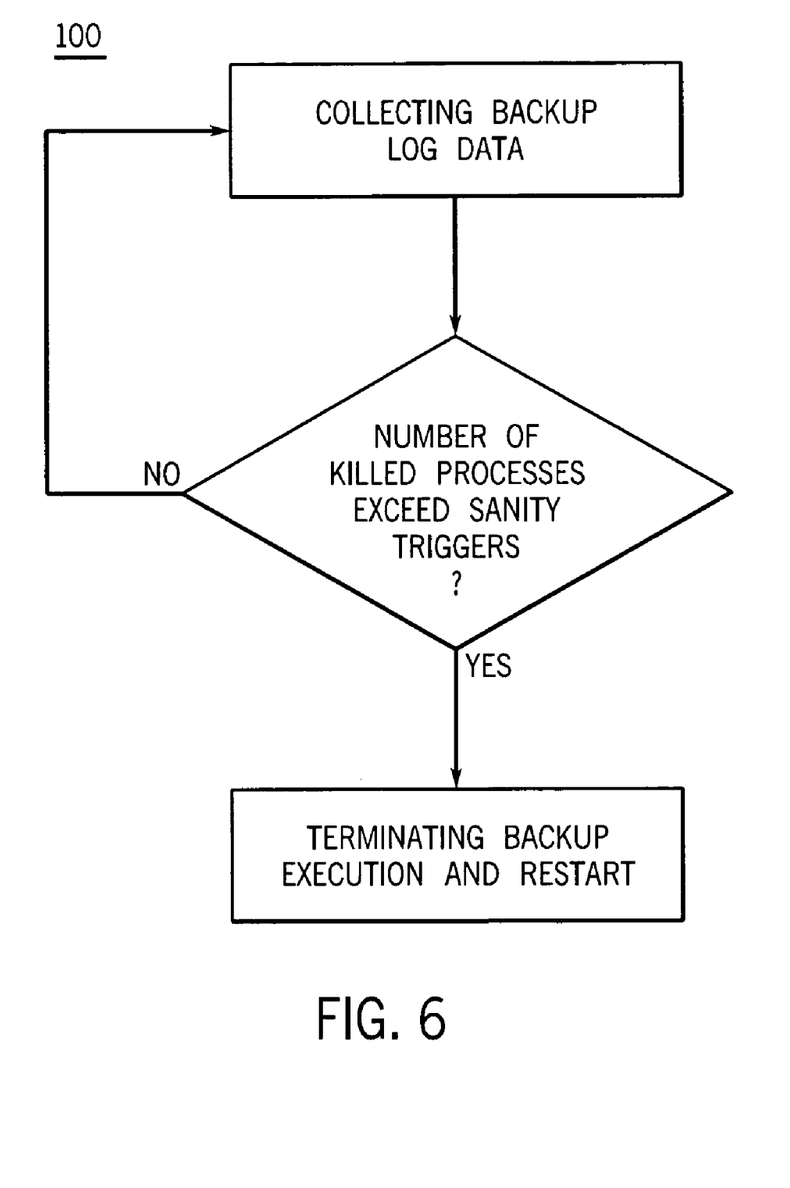
FIG. 6 is an exemplary process flow of determining one or more occurrences of one or more failures of the network elements of the apparatus of FIG. 1.

Turning to FIG. 6, the backup server component 145 schedules a backup job for the network element 130. A sanity trigger for the network element 130 comprises a threshold number for a number of killed processes for the network element 130 within a period of time, for example, ten failed processes per backup job. In STEP 605, the watchdog recovery control component 180 monitors the logfiles from the network element 130 to obtain a number of killed processes for the backup job. The watchdog recovery control component 180 updates the backup log data for the network element 130 with the number of killed processes for the backup job. In STEP 610, the watchdog recovery control component 180 compares the backup log data for the network element 130 with the sanity trigger for the network element 130. Where the watchdog recovery control component 180 determines that the number of killed processes for the backup job does not exceed the sanity trigger for the network element 130, the watchdog recovery control component 180 continues to STEP 605. Where the watchdog recovery control component 180 determines that the number of killed processes for the backup job exceeds the sanity trigger for the network element 130, the watchdog recovery control component 180 continues to STEP 615. In STEP 615, the watchdog recovery control component 180 notifies the backup control component 170. The backup control component 170 terminates the backup job. The backup control component 170 reschedules the backup job for the network element 130.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 101 of the network elements 130 and 135, the remote storage facility 140, the backup server component 145, and the central backup server component 415. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the steps of:
   detecting automatically, a failure of a network element;
   retrieving electronically, a bootable image of the network element upon detection of the failure of the network element; and
   restoring the network element through employment of the bootable image;
   wherein a plurality of bootable images comprise the bootable image, and wherein the plurality of bootable images comprise a plurality of versions of the plurality of bootable images, and wherein the bootable image comprises a first version of the bootable image of the plurality of versions of the plurality of bootable images, and wherein the step of retrieving electronically, the first version of the bootable image of the network element upon the detection of the failure of the network element further comprises the steps of:
   determining a location of the first version of the bootable image;
   retrieving electronically, the first version of the bootable image from the location of the first version of the bootable image;
   employing the first version of the bootable image to restore the network element;
   determining a location of a second version of the bootable image of the plurality of versions of the plurality of bootable images upon failure to restore the network element through employment of the first version of the bootable image;
   retrieving electronically, the second version of the bootable image from the location of the second version of the bootable image; and
   employing the second version of the bootable image to restore the network element.

2. The method of claim 1, further comprising the steps of:
   copying the bootable image onto a file system of the network element; and
   booting the network element from the bootable image.

3. The method of claim 1, wherein the network element is located on a first network, and wherein the bootable image is stored on a second network, and wherein the step of retrieving electronically, the bootable image of the network element upon the detection of the failure of the network element further comprises the step of:
   employing an electronic file transfer protocol to retrieve the bootable image from the second network of the network element.

4. An apparatus, comprising:
   a backup server component that electronically retrieves one or more bootable images of one or more network elements of a plurality of network elements from one or more remote storage facilities upon one or more failures of the one or more network elements;
   wherein the backup server component restores the one or more network elements through employment of the one or more bootable images; and
   wherein the backup server component receives a plurality of network element event logfiles from the plurality of network elements; and
   wherein the backup server component monitors the plurality of network element event logfiles to detect the one or more failures of the one or more network elements; and
   wherein a plurality of backup server components comprise the backup server component, and wherein the backup server components are located on a plurality of networks, and wherein the plurality of network elements are located on the plurality of networks, the apparatus further comprising:
   a central backup server component;
   wherein one or more of the plurality of backup server components notify the central backup server component upon occurrence of the one or more failures of the one or more network elements; and
   wherein the central backup server component employs the one or more failures of the one or more network elements to determine one or more health ratings for the plurality of networks.

5. The apparatus of claim 4, wherein the one or more network elements comprises a network element, and wherein the one or more bootable images comprises a bootable image for the network element, and wherein the one or more remote storage facilities comprises a remote storage facility, and wherein the backup server component is located at a first location, and wherein the network element is located at the first location, and wherein the remote storage facility is located at a second location; and
   wherein the backup server component at the first location electronically retrieves the bootable image from the remote storage facility at the second location; and
   wherein the backups server component at the first location transmits the bootable image to the network element at the first location.

6. The apparatus of claim 4, wherein the backup server component receives the one or more bootable images of the one or more network elements from the one or more remote storage facilities; and     wherein the backup server component copies the one or more bootable images onto one or more file systems of the one or more network elements; and     wherein the backup sewer component starts the one or more network elements, and wherein the one or more network elements employ the bootable images to start.

7. The apparatus of claim 4, wherein the backup server component is located on a first network of a plurality of networks, and wherein the one or more network elements are located on the plurality of networks, and wherein the one or more remote storage facilities are located on a second network of the plurality of networks; and     wherein the backup server component employs one or more electronic file transfer protocols to electronically retrieve the one or more bootable images from the one or more remote storage facilities; and     wherein the backup server component employs one or more direct communication links to copy the one or more bootable images onto the one or more network elements.

8. The method of claim 1, wherein the step of detecting automatically, the failure of the network element further comprises the steps of:

monitoring a network element event logfile of the network element;

performing one or more comparisons of the network element event logfile to one or more sanity triggers for the network element; and     determining occurrence of one or more threshold conditions based on the one or more comparisons.

9. The method of claim 8, wherein the step of determining the occurrence of the one or more threshold conditions based on the one or more comparisons further comprises the step of:

initiating one or more notifications to one or more network support components for the network element.

10. The method of claim 1, wherein the network element is located at a first location of a plurality of locations, and wherein the bootable image is located at a second location of the plurality of locations, and wherein the step of retrieving electronically, the bootable image of the network element upon the detection of the failure of the network element further comprises the steps of:

determining the second location of the bootable image; and     employing an electronic file transfer protocol to retrieve the bootable image from the second location.

11. The method of claim 10, wherein the bootable image comprises a version of the bootable image of a plurality of versions of the bootable image, and wherein the step of determining the second location of bootable image further comprises the step of:

selecting the version of the bootable image from the plurality of versions of the bootable image.

12. The apparatus of claim 4, wherein the backup server component employs one or more sanity triggers to detect the one or more failures of the one or more network elements.

* * * * *